July 10, 1951  R. M. KING  2,559,970
INTERNAL-COMBUSTION ENGINE WITH ENERGY STORING MEANS
Filed Aug. 9, 1949  2 Sheets-Sheet 1

INVENTOR:
R. M. King
BY
Glauck Downing Seebold
Attorneys

July 10, 1951    R. M. KING    2,559,970
INTERNAL-COMBUSTION ENGINE WITH ENERGY STORING MEANS
Filed Aug. 9, 1949    2 Sheets-Sheet 2
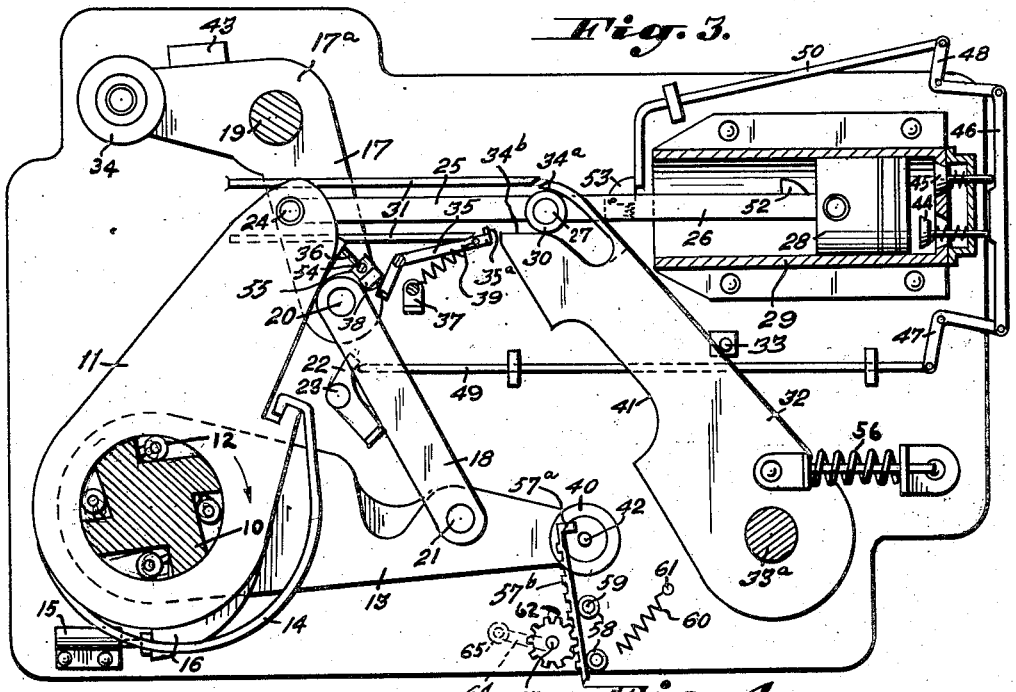
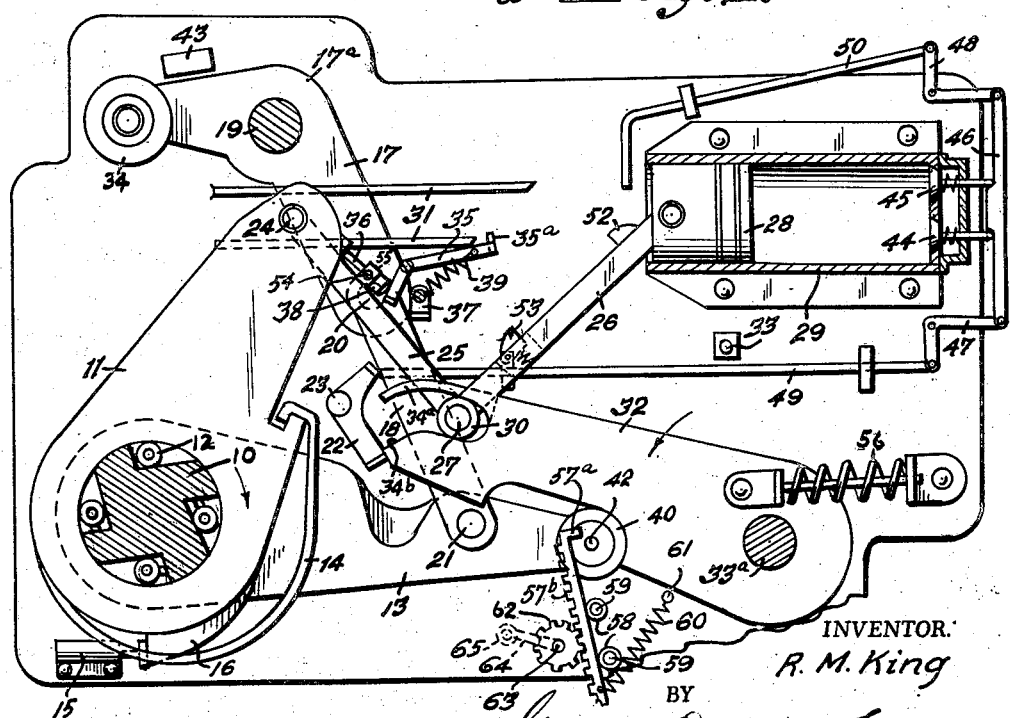
INVENTOR.
R. M. King
BY
Attorneys.

Patented July 10, 1951

2,559,970

UNITED STATES PATENT OFFICE 2,559,970

INTERNAL-COMBUSTION ENGINE WITH ENERGY STORING MEANS

Roland M. King, Salisbury, N. C.

Application August 9, 1949, Serial No. 109,307

9 Claims. (Cl. 60—7)

1

This invention relates to improvements in variable stroke internal combustion engines with energy storing means and has for its object to provide an arrangement wherein an engine operating on the principle of an internal combustion engine is combined with an energy storing and delivering device preferably in the form of a spring and affording mechanical power for a variety of useful purposes.

A further object of the invention is the provision of a variable stroke internal combustion engine with energy storing means having a high starting torque and capable of operation at relatively low speed and also having full stall torque.

Figure 1:
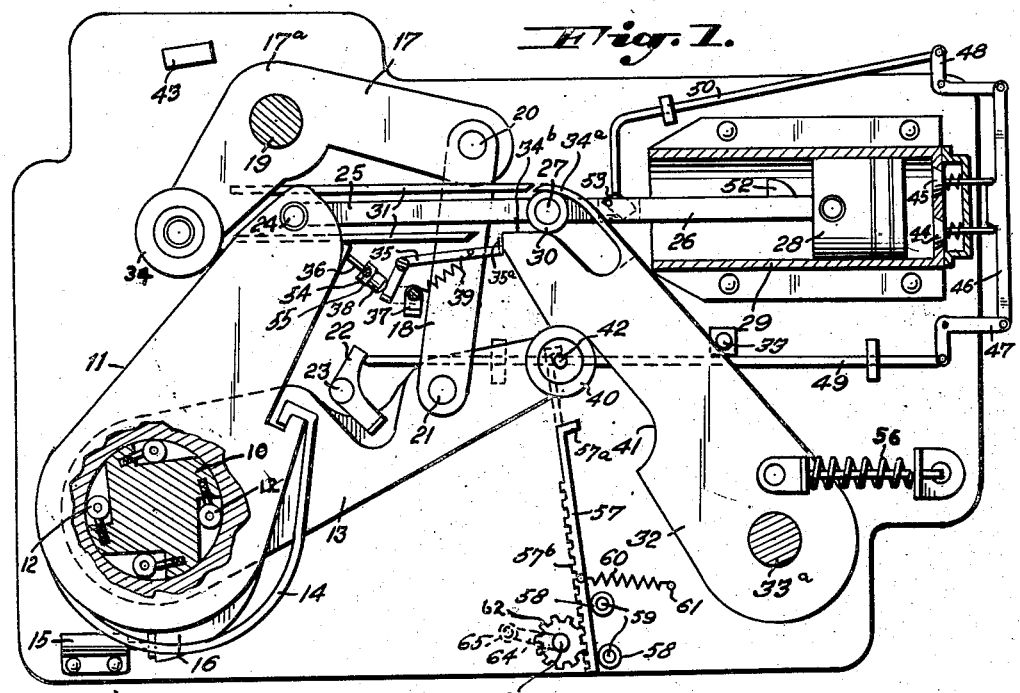
Figure 2:
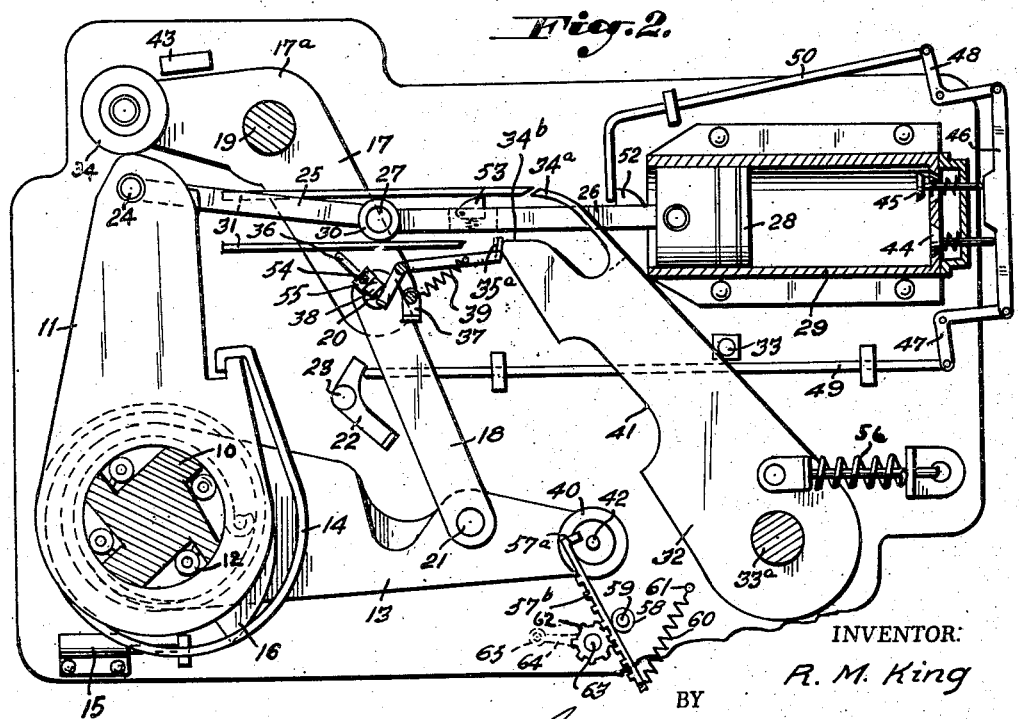

With the foregoing and other objects in view the invention consists of the details of construction described in the following specification and illustrated in the accompanying drawings, in which:

Figure 1 is a view of the variable stroke internal combustion engine with energy storing means partly in section showing the piston at the end of the compression stroke prior to firing, Figure 2 is a similar view in which the piston is shown as approaching the limit of its power stroke prior to setting the toggle linkage 17—18 in operative position, Figure 3 shows the position of the parts of the variable stroke internal combustion engine with energy storing means when the piston is at the end of its exhaust stroke, and Figure 4 shows the joint of the two-part connecting rod broken and the piston at the end of its suction stroke.

Referring to the drawing in detail, the numeral 10 indicates a power shaft on which a main crank arm 11 is mounted with a one-way drive clutch comprised by spring pressed rollers 12 interposed in such manner that during clockwise movement of the arm 11 rotary movement is imparted to the power shaft, whereas during movement of the crank arm in the opposite direction it rotates independently of the power shaft. A lever 13 is freely rotatable on the shaft 10 and is connected with the crank arm 11 by a drive spring 14, one end of the spring being attached to the crank arm and the other end to the lever. The drive spring is of stiff modulus and is pre-tensioned and normally tends to rotate the crank arm 11 in a clockwise direction and the lever 13 in the counter-clockwise direction, the clockwise rotation of the crank arm being limited by a stop 15 cooperating with a projection 16 on the crank arm. The stop 15 is preferably of a yieldable type so as to absorb the impact of the crank arm upon its return movement, as will appear more fully from the following description.

The torque of the spring 14, in tending to rotate the crank arm 11 in the clockwise direction and the lever 13 in the counter-clockwise direction, biases these elements towards radial alignment or registering position. A toggle linkage consisting of a link 18 and a bell crank lever 17 is connected to the lever 13. The bell crank lever is pivotally mounted at 19 at a fixed point and the end of the arm 17 is pivotally connected at 20 to the adjacent extremity of the link 18 while the opposite end of the latter is pivotally connected at 21 to the lever 13. When the lever arm 17 and link 18 are moved slightly beyond the position of alignment and into abutment with a trigger 22 the toggle linkage is effective to retain the lever 13 in its inoperative position, whereas when the trigger 22 is swung around its pivot 23 the toggle joint is broken and the tension of the spring 14 becomes operative to swing the lever 13 upwardly in the counterclockwise direction.

The outer extremity of the crank arm 11 is pivotally connected at 24 with one end of a jointed two-part connecting rod 25—26, the adjacent ends of which are pivotally connected at 27. The opopsite end of the connecting rod is pivotally secured to a piston 28 reciprocably mounted in a horizontal cylinder 29. A roller 30 is rotatably mounted at the pivotal connection between the parts of the connecting rod and is movable through a guide 31 during the power stroke of the piston whereby the parts of the rod are maintained in alignment and the thrust of the piston 28 is imparted to the crank arm 11 to cause the latter to swing about the power shaft 10 without, however, imparting rotary motion thereto due to over-running of the clutch 12.

The modulus and pre-set tension of the spring 14 are sufficient to prevent the crank arm 11 from being rotated in the counter-clockwise direction during the compression stroke.

As the piston 28 reaches the limit of the following exhaust stroke actuated by the crank arm 11 moving under the influence of the spring 14, the roller 30 assumes a position lying over a cut away portion of the guide 31 so that, upon application of downward pressure to the joint between the parts of the connecting rod, the latter are caused to assume such angular positions that the piston 28 is moved in the direction of the power shaft 10 a distance sufficient to draw a charge of fuel mixture into the combustion chamber through the inlet valve, as will hereinafter appear.

A piston actuating lever 32 is pivotally secured at 33a to a fixed point and is subjected to the compression of a spring 56 normally tending to swing the lever in the counter-clockwise direction. When the lever 32 is in the raised position the end surface 34b thereof forms a continuation of the cutaway portion of the guide 31 and co-acting with the roller 30 maintains the parts of the connecting rod 25—26 in alignment. A finger 34a provided with a curved extremity is formed on the lever 32 and is operative when the latter is swung in a counter-clockwise direction to engage and lower the roller 27 and thereby break the joint of the two part connecting rod in such manner that the parts assume the angular position shown in Figure 4.

The piston actuating lever 32 is locked in the raised position by a pivoted detent 35 having an outwardly extending toe 35a engageable by end surface 34b of the lever, the detent in turn being engageable by a releasing pin 36 operated by the extremity of the crank arm 11 at the limit of the clockwise movement of said crank arm immediately prior to the engagement of the projection 16 with the stop 15. The releasing pin 36 is pivotally mounted by a strap 55 carried on a bolt 54. The detent 35 is biased by a spring 39 in such manner that it is normally held in operative locking position and after operation by the releasing pin 36 and the release of the piston actuating lever 32, said detent returns to its operative position so as to re-lock the lever 32 upon the return movement of the latter.

A manually operable lock 37 is movable into a position to prevent operation of the detent 35 and thus to terminate operation of the engine when desired. The extremity of the releasing pin 36 is provided with a spring pressed cap member 38 which is engageable with the detent 35 when the latter is locked by the member 37 and in this manner damage is prevented upon the return motion of the crank arm 11.

During the operative movement of the piston actuating lever 32 under the influence of the spring 56, the piston 28 is partially withdrawn, as stated, and also the extremity of said lever engages one end of the trigger 22 and in turning about its pivotal axis 23 said trigger displaces and breaks the joint of the pivoted members 17 and 18. The lever 13 is thus released and permitted to turn freely about the power shaft 10 under the influence of the drive spring 14. The extremity of the lever 13 is provided with a roller 40 mounted on a pin 42 which roller engages in a notch 41 in the lever 32 and restores the latter to raised position. A stop 33 limits the clockwise rotation of the lever 32 to such position. During the last mentioned return movement of the lever 32 the end surface 34b engages the roller 30 restoring the parts 25 and 26 of the connecting rod to alignment and the piston 28 is thus moved outwardly.

The lever 32 is held in the raised position by the roller 40 on the lever 13.

The arm of the bell crank lever 17a opposite that connected with the link 18 is provided with a roller 34 which is engaged by the crank arm 11 and restores the linkage 17—18 to operative position during the power stroke of the piston 28, as will hereinafter appear. The clockwise movement of the bell crank lever 17 is limited by a stop 43.

The head of the cylinder 29 is provided with inlet and exhaust valves 44 and 45, respectively, the stems of which are engaged and operable by a cam plate 46. The cam plate is supported and actuated by bell crank levers 47 and 48 connected with the links 49 and 50. The cam plate 46 is operative when fully raised, Figure 2, to engage and open the exhaust valve 45 and when moved downwardly to the limit of its movement, Figure 3, said cam plate opens the inlet valve 44. In the intermediate position of the cam plate, Figures 1 and 4, both valves assume the closed position and the charge in the combustion chamber of the cylinder is compressed by the piston 28. The link 50 is operated in one direction to raise the cam plate 46 and thereby open the exhaust valve 45 by an abutment 52 on the part 26 of the connecting rod engaging the angular end of the link 50. The cam plate 46 is moved in the opposite direction to permit the exhaust valve to close and to open the inlet valve 44 by an abutment 53 secured to the part 26. The abutment 52 may be fixed but the abutment 53 is pivoted to the part 26 of the connecting rod and is normally held in raised operative position by a spring so that the part 26 may be freely raised at one stage in the operation of the device, as will hereinafter more fully appear. The cam plate 46 is moved to the intermediate position in which both valves 44 and 45 are closed by the trigger 22 engaging the extremity of the link 49 following the completion of the suction stroke of the piston 28.

In order to start the engine the lever 13 must be moved from the raised position of Figure 1 to the lower position of Figure 4. To accomplish this a starting mechanism is provided. This mechanism is comprised principally by a reciprocable bar 57 having an upper hook end 57a and rack teeth 57b on its under side. The bar 57 is guided between a pair of rollers 58 mounted on pivots 59 and a spur pinion 62 fixed to a rotatable stub shaft 63. A coil spring 60 attached at one end to a pin 61 and at the other end to the reciprocable bar 57 biases this bar toward the right (Fig. 1). The stub shaft 63 has affixed thereto a crank arm 64 with a handle 65 thereon for rotating the spur pinion 62.

For starting the engine the spur pinion 62 is rotated in a counter-clockwise direction (Figure 1) by the handle 65 and crank arm 64 thereby raising the reciprocable bar 57. The upper or hook end 57a of this bar will pass over the pivot pin 42 of the roller 40 but will thereafter become engaged with same due to the action of the coil spring 60 pulling the bar toward the right (Figure 1). The spur pinion 62 is now rotated in a clockwise direction and draws the reciprocable bar 57 and the lever 13 downwardly. When the lever 13 reaches the position shown in Figure 4, in which the arm 17 and link 18 are aligned, the pivot pin 42 becomes disengaged from the hook end 57a of the reciprocable bar due to this pivot pin having travelled in an arc beyond the end of the hook end of the reciprocable bar.

The power unit operates as follows:

Assuming the piston 28 has completed its compression stroke, as shown in Figure 1, the piston actuating lever 32 being locked in raised position by the lever 13 through the roller 40, with the toggle linkage 17—18 broken, the bell crank lever being spaced from the crank arm 11 and the abutment 53 being depressed by engagement with the link 50. The charge compressed in the combustion chamber is ignited either by a spark or by the heat developed by high compression and during the ensuing power stroke of the piston the movement thereof is transmitted to the crank arm 11 through the connecting rod, the parts 25—26 of which are maintained in alignment by cooperation of the roller 30 with the surface 34b of the lever 32 and the guide 31. After limited movement of the crank arm 11 the bell crank 17a is engaged and swung clockwise, thereby swinging the lever 13 downwardly through the arm 17 and link 18 through the position shown in Figure 2 to that shown in Figure 3 until the link 18 assumes its off-center position and comes to rest against the trigger 22. Also, during the initial movement of the crank arm 11, the latter frees the releasing pin 36 and the detent 35 is released and is pulled into abutting engagement with the end surface 34b of the lever 32 by the spring 39. The clutch 12 permits the crank arm to freely turn about the shaft 10 during the power stroke of the piston and in so doing the tension of the drive spring 14 is greatly increased due to the fact that one end of the spring is attached to the crank 11 and the other end is held by the piston return lever 13, the latter having been swung to its lowered position by the alignment of the toggle linkage 17—18. As the piston 28 approaches the limit of its power stroke, Figure 2, the cam plate 46 is lifted by the engagement of the abutment 52 with the link 50 and the exhaust valve 45 is opened thereby permitting the escape of the products of combustion. Upon the reduction of pressure in the cylinder 29 the energy stored in the spring 14 operates to effect the exhaust stroke of the piston 28 through the rod 25—26 and the clockwise movement of the arm 11 is transmitted to the power shaft 10 through the clutch 12 thereby imparting a power impulse to the shaft 10. The motion of the crank arm 11 is arrested by engagement of the projection 16 with the yieldable stop 15. Near the limit of the exhaust stroke of the piston 28 the abutment 53 engages and shifts the link 50 and lowers the cam plate 46 thereby permitting closing of the exhaust valve 45 and opening the inlet valve 44, as shown in Figure 3.

Assuming that the normally operated lock 37 is in the inoperative position, the crank arm 11 in approaching the limit of its clockwise power transmitting movement engages and operates the releasing pin 36 which swings the detent 35 releasing the lever 32, Figure 3, and permitting the latter to turn counter-clockwise under the influence of the spring 56 to the position shown in Figure 4. As the lever 32 starts its downward movement finger 34a engages the roller 30, moving it and the piston rod sections 25—26 into the angular position as shown in Figure 4. The outer end of the part 25 of the piston rod is held by the crank arm 11 and consequently as the parts of the piston rod are thus moved into angular relation, the piston 28 is so moved as to draw a charge of fuel into the combustion chamber through the open inlet valve 44.

When the tip of the lever 32 strikes the trigger 22 the latter is swung to a position in which the joint of the toggle linkage 17—18 is broken and the lever 13 is released thereby permitting the spring 14 to swing the lever 13 and also the lever 32 upwardly, the roller 40 on the lever 13 coming into engagement with the lever 32. The roller 40 abuts the upper end of the notch 41 in the lever 32 and the lever 13, through the linkage 17—18, holds the roller 34 spaced a slight distance from the crank arm 11 as shown in Figure 1. The motion of the trigger 22 operates the link 49 moving the cam plate 46 to an intermediate position in which both valves 44 and 45 are permitted to close and as the lever 32 is restored to raised position the parts 26 and 25 of the piston rod are returned into alignment, the abutment 53 being depressed by engagement with the end of the link 50, as shown in Figure 1. During the compression stroke the crank 11 is held in the forward position of Figure 1 against the pressure on the piston 28 by the resistance or pre-set of the spring 14. Thus the piston 28 is caused to compress the fuel charge in the combustion chamber. The lever 13 and roller 40 lock the lever 32 and upon the ignition of the compressed charge the sequence of operations above described is repeated.

The operation of the variable stroke internal combustion engine with energy storing means may be terminated when desired by swinging the manually operated lock 37 into position to obstruct movement of the detent 35 in which case the cap 38 of the release pin 36 yields to prevent damage.

Although in the embodiment of the invention illustrated in the drawing only one cylinder is shown, it will be understood that a plurality of cylinders may be used in which case the crank arms 11 and related mechanism would be preferably arranged to operate in succession so as to insure a more uniform and continuous application of driving force to the shaft 10. In such an embodiment clutches 12 of the overrunning type are used, as may be understood, whereas in the single cylinder unit a suitable device is preferably provided to prevent reverse rotation of the main shaft.

What I claim is:

1. In a power unit, an internal combustion engine cylinder and a piston movable in said cylinder, a power shaft, an arm movably mounted on said shaft, a two-part jointed rod connecting said piston and arm, a device for storing energy actuated by said arm during the power stroke of said piston, a clutch, said energy storing device at the end of the power stroke being operative through the arm and clutch to drive said shaft and to effect the exhaust stroke of said piston, means for guiding and maintaining the parts of said rod in alignment throughout the major portion of the piston stroke, and piston actuating means controlled by said arm and operative to move the parts of the rod into angular relation to effect a partial suction stroke of the piston and to subsequently restore the rod parts to aligned position to effect the compression stroke of the piston.

2. A power unit as claimed in claim 1, wherein the piston actuating means is constituted in part by said energy storing device.

3. A power unit as claimed in claim 1, wherein said piston actuating means includes a spring actuated member movable in one direction to engage and move the parts of the piston rod into angular position, said member being moved in the opposite direction to restore the rod parts to aligned position by said energy storing device.

4. A power unit as claimed in claim 1, provided with manually operable means for disabling the piston actuating means and terminating operation of the power unit.

5. A power unit as claimed in claim 1, wherein said piston actuating means includes a spring actuated member movable in one direction to move the parts of the rod into angular relation, a restoring member operated by the energy storing device for moving the first mentioned member in the opposite direction, means operative to lock the restoring member in inoperative position, and means to release said locking means operable by the first mentioned member.

6. A power unit as claimed in claim 1, provided with shock absorbing means cooperating with said arm to yieldably limit the movement of the latter under the influence of the energy storing device.

7. A power unit as claimed in claim 1, wherein said piston actuating means includes a spring actuated member movable in one direction to move the parts of the rod into angular relation, a restoring member operated by the energy storing device for moving the first mentioned member in the opposite direction, means operative to lock the restoring member in inoperative position, means to release said locking means operable by the first mentioned member, and means actuated by said arm during the power stroke of the piston to return the second mentioned member to inoperative position.

8. A power unit as claimed in claim 1, provided with a valve mechanism for controlling the inlet and exhaust of said cylinder, means on the two-part rod for actuating said mechanism to open and close said valves, and means operative to move said mechanism to an intermediate position during the compression stroke of the piston.

9. A power unit as claimed in claim 1, provided with a valve mechanism for controlling the exhaust and inlet of said cylinder, means controlled by the two-part rod for actuating said mechanism to control the inlet and exhaust, and means operative by the piston actuating means for moving the valve mechanism to an intermediate position during the compression stroke of the piston.

ROLAND M. KING.

REFERENCES CITED

The following references are of record in the file of this patent:

UNITED STATES PATENTS

| Number | Name | Date |
|---|---|---|
| 673,284 | Osborn | Apr. 30, 1901 |